(12) United States Patent
Peck et al.

(10) Patent No.: US 8,858,165 B2
(45) Date of Patent: Oct. 14, 2014

(54) SEAL ARRANGEMENT FOR VARIABLE VANE

(75) Inventors: Brian Peck, Plainfield, IN (US); Burke Snyder, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 991 days.

(21) Appl. No.: 12/894,780

(22) Filed: Sep. 30, 2010

(65) Prior Publication Data
US 2012/0082545 A1 Apr. 5, 2012

(51) Int. Cl.
*F04D 29/08* (2006.01)
*F04D 29/56* (2006.01)

(52) U.S. Cl.
CPC ............ *F04D 29/563* (2013.01); *F04D 29/083* (2013.01)
USPC ........ 415/160; 415/168.2; 415/189; 415/191; 415/209.4; 415/210.1

(58) Field of Classification Search
USPC ......... 415/148, 151, 155, 157, 159, 160, 161, 415/168.1, 168.4, 189–191, 208.2, 209.3, 415/209.4, 210.1, 229, 230
See application file for complete search history.

(56) References Cited

U.S. PATENT DOCUMENTS

| | | | |
|---|---|---|---|
| 3,645,645 A | 2/1972 | Gammill et al. | |
| 4,385,864 A | 5/1983 | Zacherl | |
| 4,576,548 A | 3/1986 | Smed et al. | |
| 4,650,397 A | 3/1987 | Rogo | |
| 4,792,277 A | 12/1988 | Dittberner, Jr. et al. | |
| 4,844,690 A | 7/1989 | DeLaurier et al. | |
| 5,344,160 A | 9/1994 | Scarlata et al. | |
| 5,746,573 A | 5/1998 | Junkin et al. | |
| 5,807,072 A * | 9/1998 | Payling ...................... | 415/170.1 |
| 6,146,093 A | 11/2000 | Lammas et al. | |
| 6,413,043 B1 | 7/2002 | Bouyer | |
| 6,767,183 B2 * | 7/2004 | Schilling et al. .............. | 415/160 |
| 6,808,364 B2 | 10/2004 | O'Reilly et al. | |

(Continued)

FOREIGN PATENT DOCUMENTS

AT            321224 B    *   3/1975

OTHER PUBLICATIONS

International Search Report and Written Opinion, PCT/US2011/054256 Rolls-Royce North American Technologies, Inc., Feb. 27, 2012.

*Primary Examiner* — Edward Look
*Assistant Examiner* — Jesse Prager
(74) *Attorney, Agent, or Firm* — Krieg DeVault LLP (57) ABSTRACT

A variable vane assembly for a gas turbine engine is disclosed herein. The variable vane assembly includes a vane operable to pivot about a pivot axis. The vane includes a flap portion positionable in a fluid stream for controlling a flow of fluid. The vane also includes a stem portion for mounting the flap portion. The vane also includes a button portion positioned between the flap portion and the stem portion along the pivot axis. The button portion is wider than the stem portion in at least one plane containing the pivot axis. The variable vane assembly also includes a bushing encircling the stem portion and abutting the button portion. The variable vane assembly also includes a labyrinth seal positioned between the bushing and the button portion.

16 Claims, 4 Drawing Sheets

(56) References Cited

U.S. PATENT DOCUMENTS

| | | |
|---|---|---|
| 7,393,179 B1 | 7/2008 | Kesseli et al. |
| 2004/0100035 A1 | 5/2004 | Turnquist et al. |
| 2006/0045728 A1 | 3/2006 | Martin et al. |
| 2008/0025837 A1* | 1/2008 | Lejars et al. ............... 415/161 |
| 2009/0060721 A1 | 3/2009 | Davis et al. |
| 2009/0060722 A1* | 3/2009 | Cloarec ...................... 415/160 |
| 2009/0071165 A1* | 3/2009 | Matz et al. ................... 60/772 |
| 2010/0111677 A1* | 5/2010 | Kilminster ................. 415/160 |

\* cited by examiner

SEAL ARRANGEMENT FOR VARIABLE VANE

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of FA8650-07-C-2803 awarded by the Department of Defense.

BACKGROUND OF THE INVENTION

1. Field of the Invention

The invention relates to vane that is variably positionable, such as in gas turbine engines, and to an approach for sealing such a vane.

2. Description of Related Prior Art

U.S. Pat. No. 6,146,093 discloses a variable vane seal and washer. In the '093 patent, a seal and a washer for a variable vane assembly in a turbine engine are described. The seal includes a first portion and a second portion that are substantially perpendicular. The seal is positioned between a variable vane and a casing. The washer is substantially flat and is located between the casing and a spacer.

SUMMARY OF THE INVENTION

In summary, the invention is a variable vane assembly for a gas turbine engine. The variable vane assembly includes a vane operable to pivot about a pivot axis. The vane includes a flap portion positionable in a fluid stream for controlling a flow of fluid. The vane also includes a stem portion for mounting the flap portion. The vane also includes a button portion positioned between the flap portion and the stem portion along the pivot axis. The button portion is wider than the stem portion in at least one plane containing the pivot axis. The variable vane assembly also includes a bushing encircling the stem portion and abutting the button portion. The variable vane assembly also includes a labyrinth seal positioned between the bushing and the button portion.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXEMPLARY EMBODIMENTS

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The invention, as demonstrated by the exemplary embodiment described below, provides a variable vane assembly incorporating a labyrinth seal. The labyrinth style sealing arrangement reduces the leakage of high pressure air from the engine flow path into lower pressure cavities where it does not perform any additional work. As each stage of the compressor adds more work to the air, this leakage has an increasingly negative effect on the overall engine performance. So a labyrinth seal can be more useful at each stage of the compressor. Also, the labyrinth seal does not greatly increase the frictional loads that must be overcome to move the vane. The labyrinth sealing feature results in low frictional loads since the seal is not dependent on a compressive load and the structures defining the labyrinth sealing feature can be formed with low coefficient of friction materials.

A labyrinth style seal incorporated in an embodiment of the invention can create a torturous path for air attempting to leak from the high pressure flow path of the engine into a lower pressure cavity below the spindle (or stem portion) of the vane. The sealing arrangement described herein avoids the frictional losses inherent with an o-ring or washer sealing arrangement, resulting in a reduction in the actuator loads required to drive the variable vane system. Since numerous vanes are often moved at one time by a common actuator, this can result in a substantial reduction in actuator loads. In the exemplary embodiment of the invention, the labyrinth seal is applied to the driven end of the vane which typically connects to a lower pressure cavity within the engine. Also, the exemplary embodiment of the invention is not dependent on air or spring pressure to maintain the position of the sealing elements.

Figure 1:
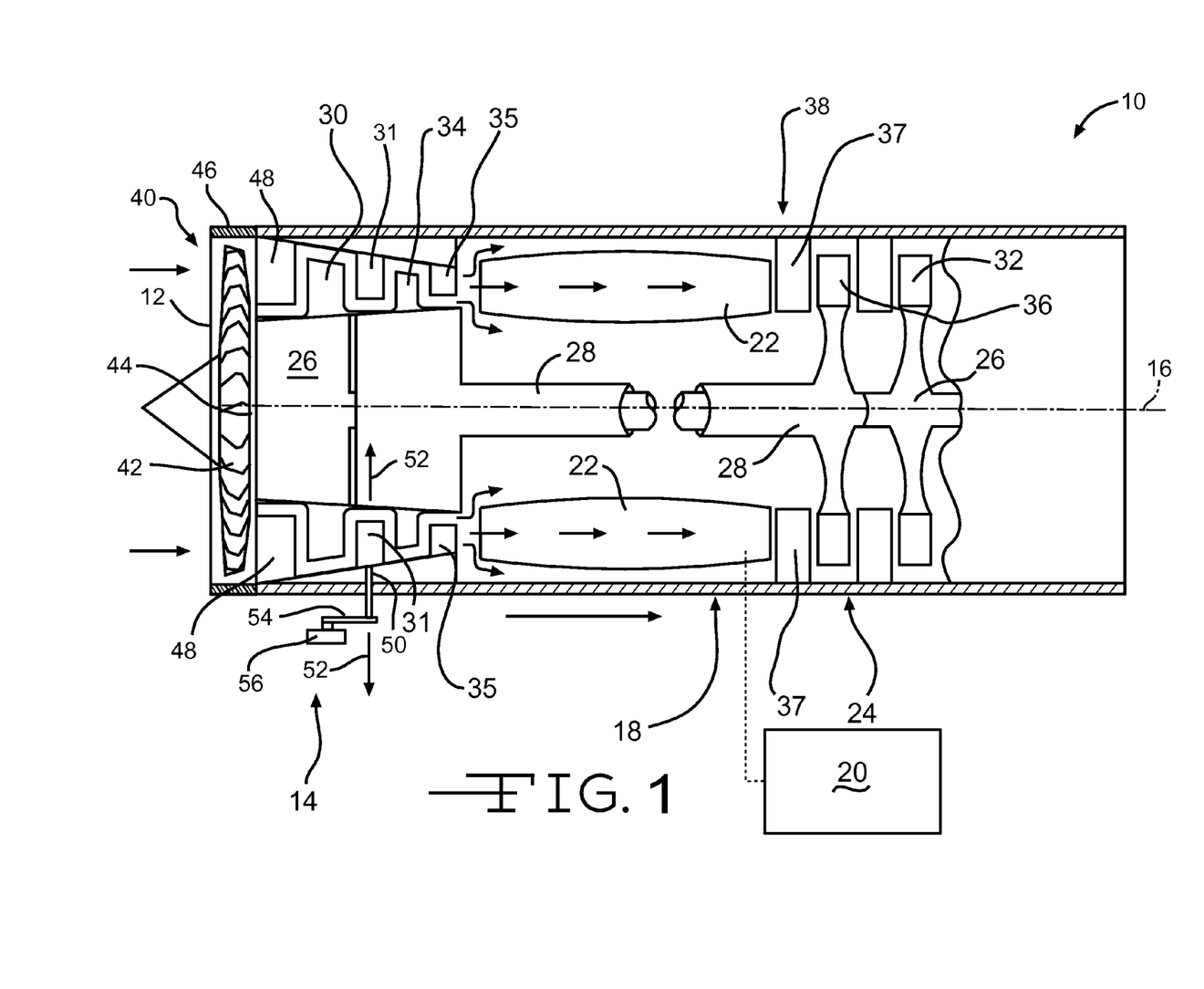
FIG. 1 is a schematic cross-section of a turbine engine that can incorporate an exemplary embodiment of the invention.

FIG. 1 schematically shows a turbine engine 10. The various unnumbered arrows represent the flow of fluid through the turbine engine 10. The turbine engine 10 can produce power for several different kinds of applications, including vehicle propulsion and power generation, among others. The exemplary embodiments of the invention disclosed herein, as well as other embodiments of the broader invention, can be practiced in any configuration of a turbine engine and in any application other than turbine engines in which inspection of difficult to access components is desired or required.

The exemplary turbine engine 10 can include an inlet 12 to receive fluid such as air. The turbine engine 10 can include a fan to direct fluid into the inlet 12 in alternative embodiments of the invention. The turbine engine 10 can also include a compressor section 14 to receive the fluid from the inlet 12 and compress the fluid. The compressor section 14 can be spaced from the inlet 12 along a centerline axis 16 of the turbine engine 10. The turbine engine 10 can also include a combustor section 18 to receive the compressed fluid from the compressor section 14. The compressed fluid can be mixed with fuel from a fuel system 20 and ignited in an annular combustion chamber 22 defined by the combustor section 18. The turbine engine 10 can also include a turbine section 24 to receive the combustion gases from the combustor section 18. The energy associated with the combustion gases can be converted into kinetic energy (motion) in the turbine section 24.

In FIG. 1, shafts 26, 28 are shown disposed for rotation about the centerline axis 16 of the turbine engine 10. Alternative embodiments of the invention can include any number of shafts. The shafts 26, 28 can be journaled together for relative rotation. The shaft 26 can be a low pressure shaft supporting compressor blades 30 of a low pressure portion of the compressor section 14. A plurality of vanes 31 can be positioned to direct fluid downstream of the blades 30. The shaft 26 can also support low pressure turbine blades 32 of a low pressure portion of the turbine section 24. For example, the high pressure turbine can be associated with shaft 28 can provide power to drive the compressor section 14 and the low pressure turbine associated with shaft 26 can provide power to the propeller, fan or shaft.

The shaft 28 encircles the shaft 26. As set forth above, the shafts 26, 28 can be journaled together, wherein bearings are disposed between the shafts 26, 28 to permit relative rotation. The shaft 28 can be a high pressure shaft supporting compressor blades 34 of a high pressure portion of the compressor section 14. A plurality of vanes 35 can be positioned to receive fluid from the blades 34. The shaft 28 can also support high pressure turbine blades 36 of a high pressure portion of the turbine section 24. A plurality of vanes 37 can be positioned to direct combustion gases over the blades 36.

The compressor section 14 can define a multi-stage compressor, as shown schematically in FIG. 1. A "stage" of the compressor section 14 can be defined as a pair of axially adjacent blades and vanes. For example, the vanes 31 and the blades 30 can define a first stage of the compressor section 14. The vanes 35 and the blades 34 can define a second stage of the compressor section 14. The invention can be practiced with a compressor having any number of stages.

A casing 38 defines a first wall and can be positioned to surround at least some of the components of the turbine engine 10. The exemplary casing 38 can encircle the compressor section 14, the combustor section 18, and the turbine section 24. In alternative embodiments of the invention, the casing 38 may encircle less than all of the compressor section 14, the combustor section 18, and the turbine section 24.

FIG. 1 shows the turbine engine 10 having a fan 40 positioned forward of the compressor section 14 along the centerline axis 16. The fan 40 can include a plurality of blades 42 extending radially outward from a hub 44. The fan 40 can be encircled by a fan case 46. The fan case 46 can be fixed to the casing 38. The casing 38 is shown schematically as being a single structure. In some embodiments of the invention, the casing 38 can be a single structure. In other embodiments of the invention, the casing 38 can be formed from a plurality of members that are fixed together. The forward-most member can be designated as a "front frame." The fan case 46 can be mounted to a front frame portion of the casing 38.

FIG. 1 also shows that the vanes 31 and 35 can be variable. In other words, the vanes 31, 35 can be pivoted about respective axes to vary the flow of fluid through the turbine engine 10. The turbine engine 10 can also include inlet guide vanes 48 that can be pivoted about respective axes to vary the flow of fluid through the turbine engine 10. For example, the vane 31 can include a stem 50 centered on an axis 52. It is noted that the two vanes marked 31 are distinct vanes; likewise the vanes marked 35 and 48 are distinct. The vane 31 can be pivoted about the axis 52. The stem 50 can be pivotally connected to a link arm 54 and the link arm 54 can be connected to a ring 56. The ring 56 can be rotated about the axis 16. Rotation of the ring 56 about the axis 16 can cause the link arm 54 to pivot and thereby move the vane 31 about the axis 52.

Figure 2:
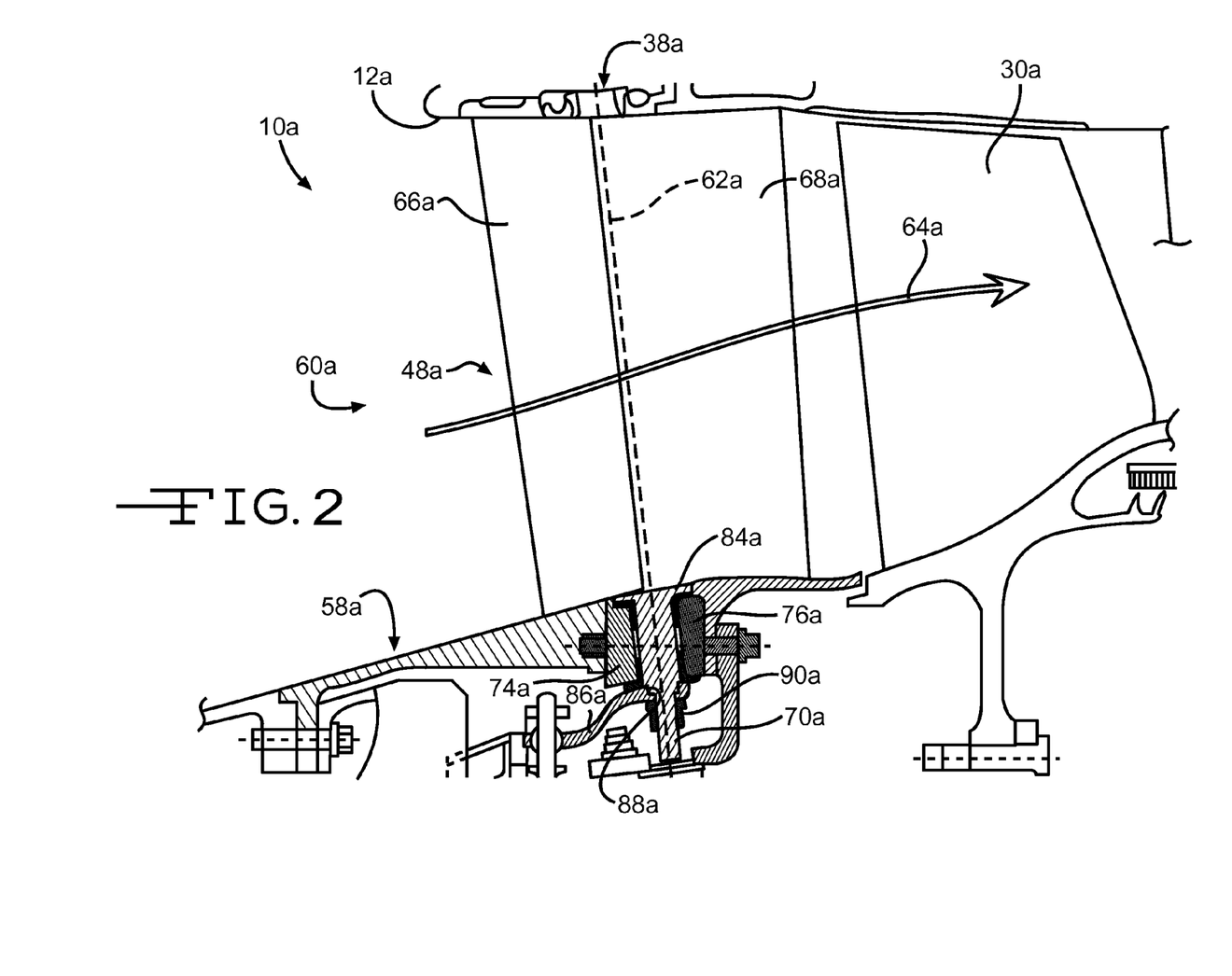
FIG. 2 is a detailed cross-section of a portion of a second turbine engine incorporating an exemplary embodiment of the invention.

An embodiment of the invention can be positioned in the first turbine engine 10 generally at the intersection of the vane 31 and the stem 50. FIG. 2 is a detailed cross-section of a portion of a second turbine engine 10a incorporating an exemplary embodiment of the invention. The turbine engine 10a can include an inlet 12a that receives fluid such as air. The inlet 12a can be ring-shaped and be defined between a radially outer casing 38a and a radially inner casing 58a. In any particular embodiment of the invention, one or both of the casings 38a, 58a can be formed as a single, unitary structure or can be formed by several structures cooperating together. The radially inner casing 58a can define the radially inner boundary of a fluid passageway referenced by the arrow 64a. The radially outer casing 38a can define the radially outer boundary of the fluid passageway 64a.

FIG. 2 shows an embodiment of a variable vane assembly 60a. The variable vane assembly 60a includes a vane 48a operable to pivot about a pivot axis 62a. As shown by FIG. 2, the vane 48a can be positioned proximate to the inlet 12a of the fluid passageway 64a. The exemplary vane 48a includes a first portion 66a that is fixed and extends between the casings 38a, 58a. The vane 48a includes a flap portion 68a positionable in the fluid stream for controlling a flow of fluid. The vane 48a can be moved between end limits of travel. At a first end limit of travel, the flap portion 68a can minimally restrict the flow of fluid passing along the fluid passageway 64a. At a second end limit of travel, the flap portion 68a can restrict the flow of fluid along the fluid passageway 64a to a greater extent than when at the first end of limit of travel. Generally, at least some fluid will be flowing at all times but this is not a limitation on the invention. Fluid can pass across the flap portion 68a and travel aft to a rotating blade 30a.

The flap portion 68a can be connected to the first portion 66a through a hinge. In the exemplary embodiment, flap portion 68a can pivot over less than 360° of travel. In other words, the first and second end limits of travel can be less than 360° apart in any angular direction. The flap portion can be up to 100% of the chord length for the vane. In other words, embodiments of the invention can be applied to a "traditional" vane such as one without a first (fixed) portion. It is also noted that embodiments of the invention can be applied in numerous areas of a gas turbine engine, including compressor vanes, fans, and any other structure that pivots and guides the flow of fluid.

Figure 3:
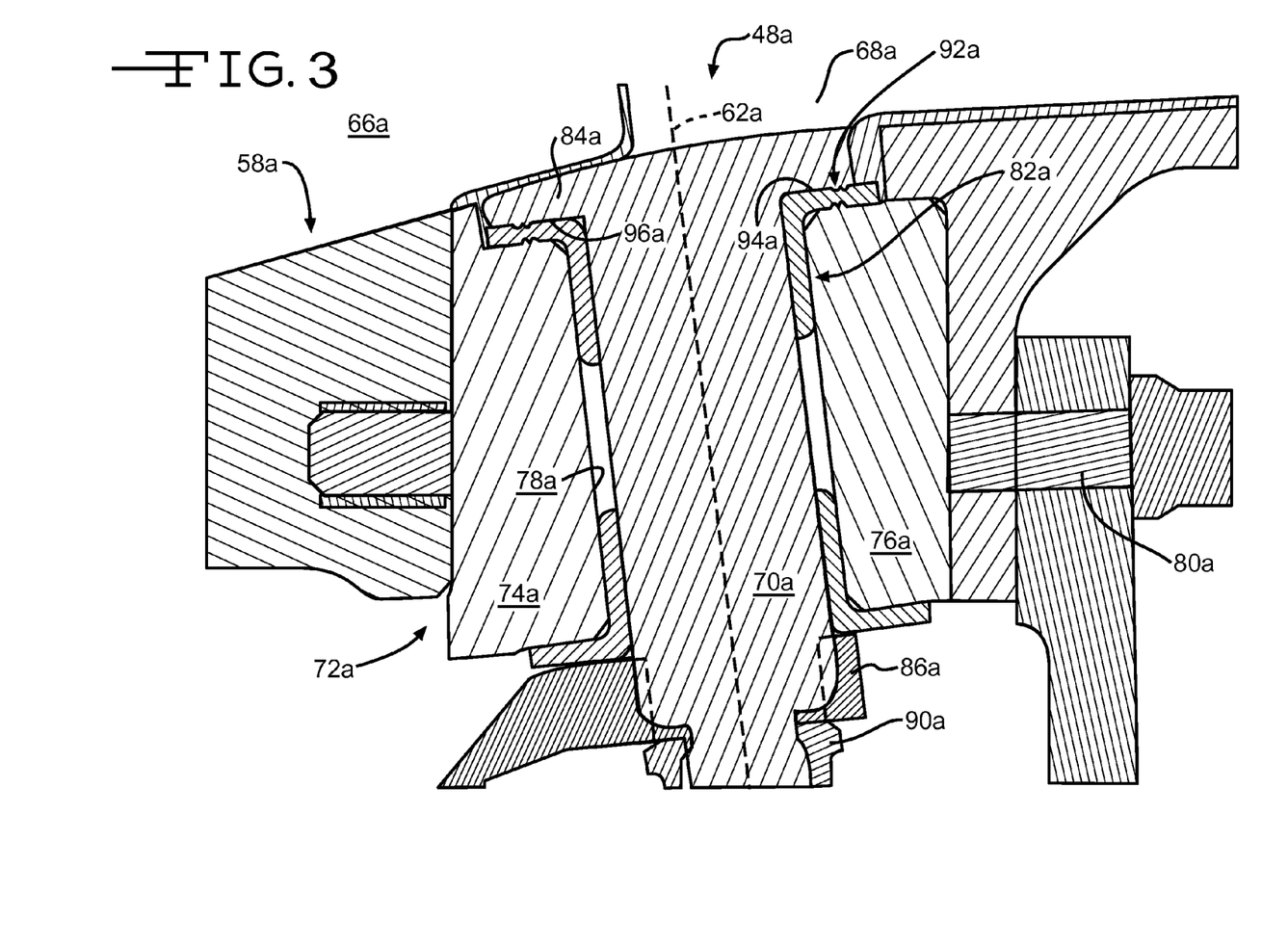
FIG. 3 is a magnified portion of FIG. 2.

FIG. 3 magnifies some of the structures in FIG. 2 and shows that the vane 48a also includes a stem portion 70a (sometimes referred to as a spindle) for mounting and moving the flap portion 68a. The stem portion 70a can be useful for mounting the flap portion 68a to one of the radially outer casing 38a and the radially inner casing 58a. In the exemplary embodiment, the vane 48a is mounted to the radially inner casing 38a through a housing 72a. The housing 72a can be one of a plurality of structures that cooperate to define the inner casing 58a. The housing 72a can be formed in first and second halves 74a, 76a, disposed on opposite axial sides of the stem 70a. The first and second halves 74a, 76a can cooperate to form an aperture 78a that receives the stem portion 70a. The first and second halves 74a, 76a can be fixed together with a fastener extending along the centerline axis of the turbine engine, such as fastener 80a. The housing 72a can fix the rectilinear position of the pivot axis 62a in the turbine engine 10a.

The variable vane assembly 60a also includes a bushing 82a encircling the stem portion 70a. The bushing 82a can be received in the aperture 78a of the housing 72a. The bushing 82a can be formed from a low-friction material to enhance the pivoting movement of the stem portion 70a.

The bushing 82a can abut a button portion 84a of the vane 48a. The button portion 84a is positioned between the flap portion 68a and the stem portion 70a along the pivot axis 62a. The button portion 84a is wider than the stem portion 70a in at least one plane containing the pivot axis 62a. FIG. 3 shows such a plane. The button portion 84a can limit travel of the vane 48a into the aperture 78a of the housing 72a.

Referring again to FIG. 2, an actuator including a link arm 86a can be engaged with the stem portion 70a to pivot the vane 48a. The actuator can be powered hydraulically, electrically, or pneumatically in various embodiments of the invention. The stem portion 70a can be inserted through an aperture 88a of the link arm 86a. The link arm 86a and stem portion 70a can be fixed together for concurrent rotation. A fastener such as a nut 90a can be engaged with the stem portion 70a and bring the button portion 84a, the bushing 82a, the housing 72a, and the link arm into non-compressive contact with one another along the pivot axis 62a. In other words, these structures need not be pressed together to effectuate a seal, as will be described below. The fastener 90a thus limits movement of the housing 72a, the bushing 82a, and the button portion 84a relative to one another to enhance the sealing of a labyrinth seal and a second labyrinth seal (both to be described in greater detail below) without compressing the housing 72a, the busing, or the button portion 84a. The link arm 86a can pivot the vane 48a at a rate of less than two radians per second in the exemplary embodiment of the invention. One rate of pivoting movement can be 0.5 radian per second.

Referring again to FIG. 3, the variable vane assembly 60a also includes a labyrinth seal 92a positioned between the bushing 82a and the button portion 84a. A labyrinth seal is a type of mechanical seal that provides a tortuous path to help prevent fluid leakage. A labyrinth seal may be composed of many grooves so that the fluid has to pass through a long and difficult path to escape. Sometimes screw threads (spirals) exist on the outer and inner portion of a labyrinth seal. These interlock, to produce the long characteristic path which slows leakage. The long and difficult flow path for escaping fluid, the formation of controlled fluid vortices, and some limited contact-sealing action create the seal. Circular grooves can also effectuate a labyrinth seal.

Figure 4:
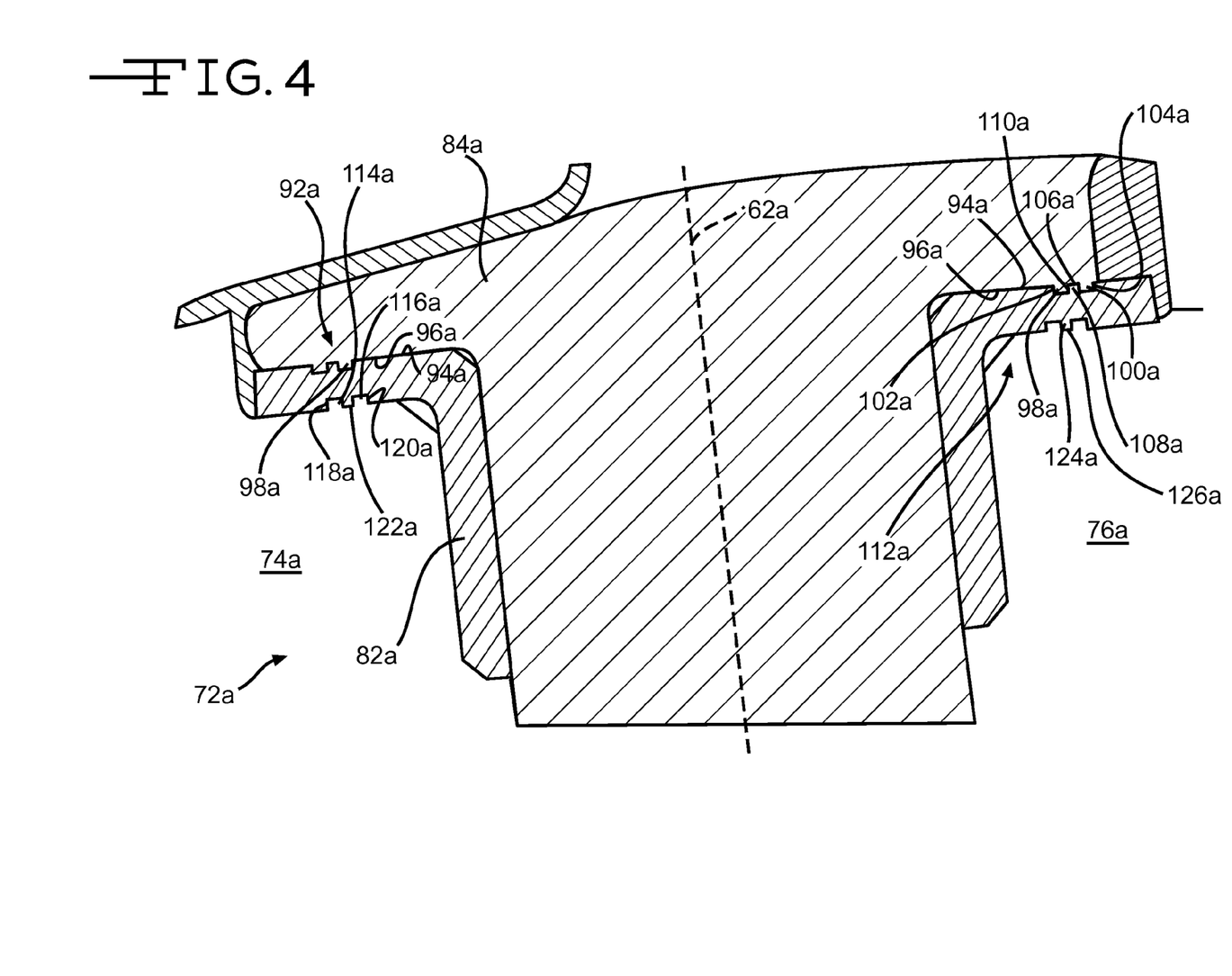
FIG. 4 is a magnified portion of FIG. 3.

Referring now to FIG. 4, in the exemplary embodiment, the bushing 82a and the button portion 84a include respective first and second abutting surfaces 94a, 96a that contact one another and are substantially flat in a plane normal to the pivot axis 62a. The invention does not require that the surfaces 94a, 96a be flat. The labyrinth seal 92a can include knife projections 98a, 100a formed by the button portion 84a. The knife projections 98a, 100a are received in grooves 102a, 104a defined by the bushing 82a. The knife projections 98a, 100a are immediately adjacent to one another such that the two knife portions share a bottom-most edge 106a. A knife projection 108a formed by the bushing 82a is received in a groove 110a formed by the button portion 84a, defined between the knife projections 98a, 100a. The features of the labyrinth seal 92a can thus be integral with the bushing 82a and button portion 84a. The knife projections 98a, 100a, 108a and grooves 102a, 104a, 110a extend away from the first and second abutting surfaces 94a, 96a along the pivot axis 62a.

It is noted that the cross-section shown in FIG. 4, relative to the features of the labyrinth seal 92a, can be the cross-section of the labyrinth seal 92a at every position about the pivot axis 62a. In other words, the knife projections 98a, 100a, 108a and grooves 102a, 104a, 110a can be circular and arranged concentrically relative to one another. The knife projections 98a, 100a, 108a and grooves 102a, 104a, 110a can discourage airflow leakage from the flow path down the stem portion 70a of the vane 48a even in cases where there is some play in the diametrical fit or where the button portion 84a does not ride perfectly flat on the bushing 82a.

Similar knife and groove features can also be included on the opposite side of the bushing 82a to discourage an alternate leakage path. A second labyrinth seal 112a can be positioned between the bushing 82a and the housing 72a. The labyrinth seals 92a, 112a can be spaced substantially the same distance from the pivot axis 62a or different distances. The second labyrinth seal 112a can include knife projections 114a, 116a formed by the housing 72a. The knife projections 114a, 116a are received in grooves 118a, 120a defined by the bushing 82a. The knife projections 114a, 116a are immediately adjacent to one another such that the two knife portions share a bottom-most edge 122a. A knife projection 124a formed by the bushing 82a is received in a groove 126a formed by the housing 72a, defined between the knife projections 114a, 116a. The features of the second labyrinth seal 112a can thus be integral with the bushing 82a and housing 72a. The knife projections 114a, 116a, 124a and grooves 118a, 120a, 126a extend away from the first and second abutting surfaces 94a, 96a along the pivot axis 62a.

The knife projections and grooves define uneven or "non-flat" surfaces of the bushing 82a, button portion 84a, and housing 72a that mate with one another and interlock to define torturous paths for fluid escaping from the fluid passageway 64a. Embodiments of the invention can be practiced with any number of uneven surfaces to form any number of labyrinth seals.

It is noted that in every variable vane in a turbine engine can incorporate a labyrinth seal in an embodiment of the invention.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A variable vane assembly for a gas turbine engine comprising:
    a vane operable to pivot about a pivot axis and having:
        a flap portion positionable in a fluid stream for controlling a flow of fluid,
        a stem portion for mounting said flap portion, and
        a button portion positioned between said flap portion and said stem portion along said pivot axis, wherein said button portion is wider than said stem portion in at least one plane containing said pivot axis; and
    a bushing encircling said stem portion and abutting said button portion; and
    a labyrinth seal positioned between said bushing and said button portion,
    a housing having an aperture receiving said stem portion and said bushing;
    a second labyrinth seal positioned between said bushing and said housing; and wherein at least part of said labyrinth seal and at least part of said second labyrinth seal are defined by said bushing.

2. The variable vane assembly of claim 1 wherein said labyrinth seal further comprises:
at least one knife projection extending along and spaced from said pivot axis formed by one of said button portion and said bushing; and
at least one groove receiving said knife projection, said at least one groove formed by the other of said button portion and said bushing.

3. The variable vane assembly of claim 2 wherein said bushing and said button portion include respective first and second abutting surfaces that contact one another and are substantially flat in a plane normal to said pivot axis, wherein said at least one knife projection and said at least one groove extend away from said first and second abutting surfaces along said pivot axis.

4. The variable vane assembly of claim 3 wherein at least one of said button portion and said bushing include a plurality of knife projections. The variable vane assembly of claim 3 wherein at least one of said button portion and said bushing include a plurality of knife projections.

5. The variable vane assembly of claim 4 wherein at least some of said plurality of said knife projections defined by said one of said bushing and said button portion are immediately adjacent to one another.

6. The variable vane assembly of claim 4 wherein each of said plurality of said knife projections are circular and are arranged concentrically relative to one another.

7. The variable vane assembly of claim 1 wherein said labyrinth seal and said second labyrinth seal are spaced substantially the same distance from said pivot axis.

8. The variable vane assembly of claim 1 wherein said labyrinth seal includes an uneven surface defined by said bushing and a mating uneven surface defined by one of said button portion and said housing, said mating surface shaped to correspond to one another and interlock with one another.

9. A method comprising the steps of disposing a vane to pivot about a pivot axis, the vane having:
a flap portion positionable in a fluid stream for controlling a flow of fluid,
a stem portion for mounting the flap portion, and
a button portion positioned between the flap portion and the stem portion along the pivot axis, wherein the button portion is wider than the stem portion in at least one plane containing the pivot axis;
encircling the stem portion with a bushing abutting the button portion; and
positioning a labyrinth seal between the bushing and the button portion; and
mounting the vane in a housing to fix the rectilinear position of the pivot axis;
positioning a second labyrinth seal between the bushing and the housing; and
forming a portion of the labyrinth seal and the second labyrinth seal integrally with respect to the bushing.

10. The method of claim 9 further comprising the step of: pivoting the vane over less than 360° of travel.

11. The method of claim 9 further comprising the step of: pivoting the vane at a rate of less than two radians per second.

12. The method of claim 9 further comprising the step of: forming mating portions of the labyrinth seal integrally with respect to the button portion and the bushing.

13. The method of claim 9 further comprising the step of: limiting movement of the housing, the bushing, and the button portion relative to one another to enhance the sealing of the labyrinth seal and the second labyrinth seal without compressing the housing, the bushing, or the button portion.

14. A turbine engine comprising:
a radially outer casing encircling a centerline axis;
a radially inner casing encircling said centerline axis, wherein a fluid passageway is defined between said radially outer casing and said radially inner casing;
a vane operable to pivot about a pivot axis and having:
a flap portion positioned in said fluid passageway for controlling a flow of fluid,
a stem portion for mounting said flap portion to one of said radially outer casing and said radially inner casing, and
a button portion positioned between said flap portion and said stem portion along said pivot axis, wherein said button portion is wider than said stem portion in at least one plane containing said pivot axis; and
a bushing encircling said stem portion and abutting said button portion, said bushing and said stem portion received in an aperture in one of said radially outer casing and said radially inner casing; and
at least part of a labyrinth seal and a second labyrinth seal defined by a portion of said bushing; and the labyrinth seal positioned between said bushing and said button portion, and the second labyrinth seal positioned between said bushing and the housing.

15. The turbine engine of claim 14 wherein said vane is positioned proximate to an inlet of said fluid passageway.

16. The turbine engine of claim 14 further comprising:
a housing being part of one of said radially outer casing and said radially inner casing and defining said aperture receiving said stem portion and said bushing;
an actuator including a link arm engaged with said stem portion to pivot said vain; and
a fastener engaged with said stem portion and bringing said button portion, said bushing, said housing, and said link arm into non-compressive contact with one another along said pivot axis.

* * * * *

UNITED STATES PATENT AND TRADEMARK OFFICE
CERTIFICATE OF CORRECTION

PATENT NO. : 8,858,165 B2
APPLICATION NO. : 12/894780
DATED : October 14, 2014
INVENTOR(S) : Brian T. Peck and Burke J. Snyder It is certified that error appears in the above-identified patent and that said Letters Patent is hereby corrected as shown below:

In the claims,

Col. 7, lines 21-23 (Claim 4), remove redundant second sentence "The variable vane assembly of claim 3 wherein at least one of said button portion and said bushing include a plurality of knife projections.".

Col. 8, line 45 (Claim 16), replace "a housing" with "said housing".

Col. 8, line 49 (Claim 16), replace "vain" with "vane".

Signed and Sealed this
Fifteenth Day of December, 2015

Michelle K. Lee
*Director of the United States Patent and Trademark Office*